(12) United States Patent
Badoni et al.

(10) Patent No.: US 9,762,545 B2
(45) Date of Patent: Sep. 12, 2017

(54) PROXY FORWARDING OF LOCAL TRAFFIC BY EDGE DEVICES IN A MULTI-HOMED OVERLAY VIRTUAL PRIVATE NETWORK

(71) Applicant: Cisco Technology, Inc., San Jose, CA (US)

(72) Inventors: Gaurav Badoni, San Jose, CA (US); Dhananjaya Rao, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 477 days.

(21) Appl. No.: 14/531,187

(22) Filed: Nov. 3, 2014

(65) Prior Publication Data

US 2016/0127320 A1    May 5, 2016

(51) Int. Cl.
| | | |
|---|---|---|
| *G06F 9/00* | (2006.01) | |
| *H04L 29/06* | (2006.01) | |
| *H04L 12/46* | (2006.01) | |

(52) U.S. Cl.
CPC ...... *H04L 63/0272* (2013.01); *H04L 12/4641* (2013.01); *H04L 63/0281* (2013.01); *H04L 63/162* (2013.01)

(58) Field of Classification Search
CPC ............. H04L 63/0272; H04L 12/4641; H04L 63/0281; H04L 63/162
See application file for complete search history.

(56) References Cited

U.S. PATENT DOCUMENTS

| | | |
|---|---|---|
| 6,856,991 B1 | 2/2005 | Srivastava |
| 7,159,034 B1 | 1/2007 | Rai |
| | (Continued) | |

FOREIGN PATENT DOCUMENTS

| | | |
|---|---|---|
| EP | 1124398 A1 | 8/2001 |
| EP | 2197129 A2 | 6/2010 |
| | (Continued) | |

OTHER PUBLICATIONS

Chiruvolu et al., "Issues and Approaches on Extending Ethernet Beyond LANs," IEEE Communications Magazine, Mar. 2004, pp. 80-86.

(Continued)

*Primary Examiner* — Techane Gergiso
(74) *Attorney, Agent, or Firm* — Edell, Shapiro & Finnan, LLC

(57) ABSTRACT

A first provider edge network device that is configured in a multi-homed virtual private network for a data center in which there are one or more peer edge network devices including a second edge network device, receives from the second edge network device a message indicating that a link for a particular Ethernet segment of the second edge network device in the data center is down. Information is stored at the first edge network device indicating state of links for Ethernet segments associated with each of the one or more other edge network devices at the data center. The first edge network device forwards of traffic for the particular Ethernet segment locally on Ethernet segments in the data center on behalf of the second edge network device. The proxy forwarding is performed for traffic for the particular Ethernet segment that originates from the data center, that is, for "same-site" traffic.

29 Claims, 15 Drawing Sheets

(56) References Cited

U.S. PATENT DOCUMENTS

| | | |
|---|---|---|
| 7,483,387 B2 | 1/2009 | Guichard et al. |
| 8,428,610 B2 | 4/2013 | Chowdhury et al. |
| 8,467,403 B2 | 6/2013 | Tsier et al. |
| 8,539,065 B2 | 9/2013 | Bangalore et al. |
| 8,694,664 B2 | 4/2014 | Jain et al. |
| 2003/0026260 A1 | 2/2003 | Ogasawara et al. |
| 2003/0112799 A1 | 6/2003 | Chandra et al. |
| 2003/0142685 A1 | 7/2003 | Bare |
| 2003/0172145 A1* | 9/2003 | Nguyen ............... G06Q 10/10 709/223 |
| 2003/0225887 A1 | 12/2003 | Purnadi et al. |
| 2005/0083955 A1 | 4/2005 | Guichard et al. |
| 2005/0141499 A1 | 6/2005 | Ma et al. |
| 2005/0149531 A1 | 7/2005 | Srivastava |
| 2005/0163146 A1 | 7/2005 | Ota et al. |
| 2005/0283531 A1 | 12/2005 | Chen et al. |
| 2006/0002299 A1 | 1/2006 | Mushtaq et al. |
| 2006/0159083 A1 | 7/2006 | Ward et al. |
| 2006/0198323 A1 | 9/2006 | Finn |
| 2006/0209831 A1 | 9/2006 | Shepherd et al. |
| 2007/0076732 A1 | 4/2007 | Kim |
| 2007/0121486 A1 | 5/2007 | Guichard et al. |
| 2007/0189221 A1 | 8/2007 | Isobe et al. |
| 2007/0264997 A1 | 11/2007 | Chaudhary et al. |
| 2008/0120176 A1 | 5/2008 | Batni et al. |
| 2008/0304412 A1 | 12/2008 | Schine et al. |
| 2008/0304476 A1 | 12/2008 | Pirbhai et al. |
| 2009/0037607 A1 | 2/2009 | Farinacci et al. |
| 2009/0083403 A1 | 3/2009 | Xu et al. |
| 2010/0020806 A1 | 1/2010 | Vahdat et al. |
| 2011/0110370 A1 | 5/2011 | Moreno et al. |
| 2011/0310729 A1 | 12/2011 | Raman et al. |
| 2014/0126422 A1* | 5/2014 | Bragg ................... H04L 12/462 370/255 |
| 2014/0133354 A1* | 5/2014 | Scharf ..................... H04L 45/42 370/254 |
| 2015/0244617 A1* | 8/2015 | Nakil ................. G06F 9/45558 709/224 |

FOREIGN PATENT DOCUMENTS

| | | |
|---|---|---|
| WO | 2007027658 A2 | 3/2007 |
| WO | 2009021238 A1 | 2/2009 |
| WO | 2010111142 A1 | 9/2010 |

OTHER PUBLICATIONS

Housley et al., "EtherIP: Tunneling Ethernet Frames in IP Datagrams," IETF RFC 3378, Sep. 2002.

Rosen et al., "BGP/MPLS VPNs," IETF RFC 2547, Mar. 1999.

* cited by examiner

95

|      | PE2 | PE3 | PE4 |
|------|-----|-----|-----|
| RED  | 1   | 1   | 0   |
| BLUE | 1   | 1   | 1   |

|  | PE2 | PE3 | PE4 |
|---|---|---|---|
| RED | 0 | 0 | 1 |
| BLUE | 0 | 0 | 0 |

FIG.8

PROXY FORWARDING OF LOCAL TRAFFIC BY EDGE DEVICES IN A MULTI-HOMED OVERLAY VIRTUAL PRIVATE NETWORK

TECHNICAL FIELD

The present disclosure relates to networking

BACKGROUND

In a multi-homed network, each customer edge device is attached to multiple provider edge devices using a bundled aggregation link. Each of these link bundles can be classified as a separate Ethernet Segment. Access traffic is encapsulated and sent across the core network by provider edge devices. Local bridging within the access network is done using access links local to the site.

However, pursuant to Ethernet Virtual Private Network (EVPN) procedures defined for Internet Protocol (IP) encapsulation, core traffic originated from same-site provider edge devices is blindly dropped upon receipt to prevent loops and duplicates. Local traffic forwarding is done solely based on local links, in a strategy called "localbias."

BRIEF DESCRIPTION OF THE DRAWINGS

FIG. 5 is illustrates a table listing link state information for Ethernet Segments maintained at an edge network device, according to an example embodiment.

FIG. 8 illustrates a table containing proxy forwarding responsibility information maintained at the Designated Forwarder edge network device, and sent to peer edge network devices, according to an example embodiment.

DESCRIPTION OF EXAMPLE EMBODIMENTS

Overview

In one embodiment, a first edge network device that is configured in a multi-homed virtual private network for a data center in which there are one or more peer edge network devices including a second edge network device, receives from the second edge network device a message indicating that a link for a particular Ethernet segment of the second edge network device in the data center is down. Information is stored at the first edge network device indicating state of links for Ethernet segments associated with each of the one or more other edge network devices at the data center. The first edge network device forwards of traffic for the particular Ethernet segment locally on Ethernet segments in the data center on behalf of the second edge network device.

Example Embodiments

Figure 1:
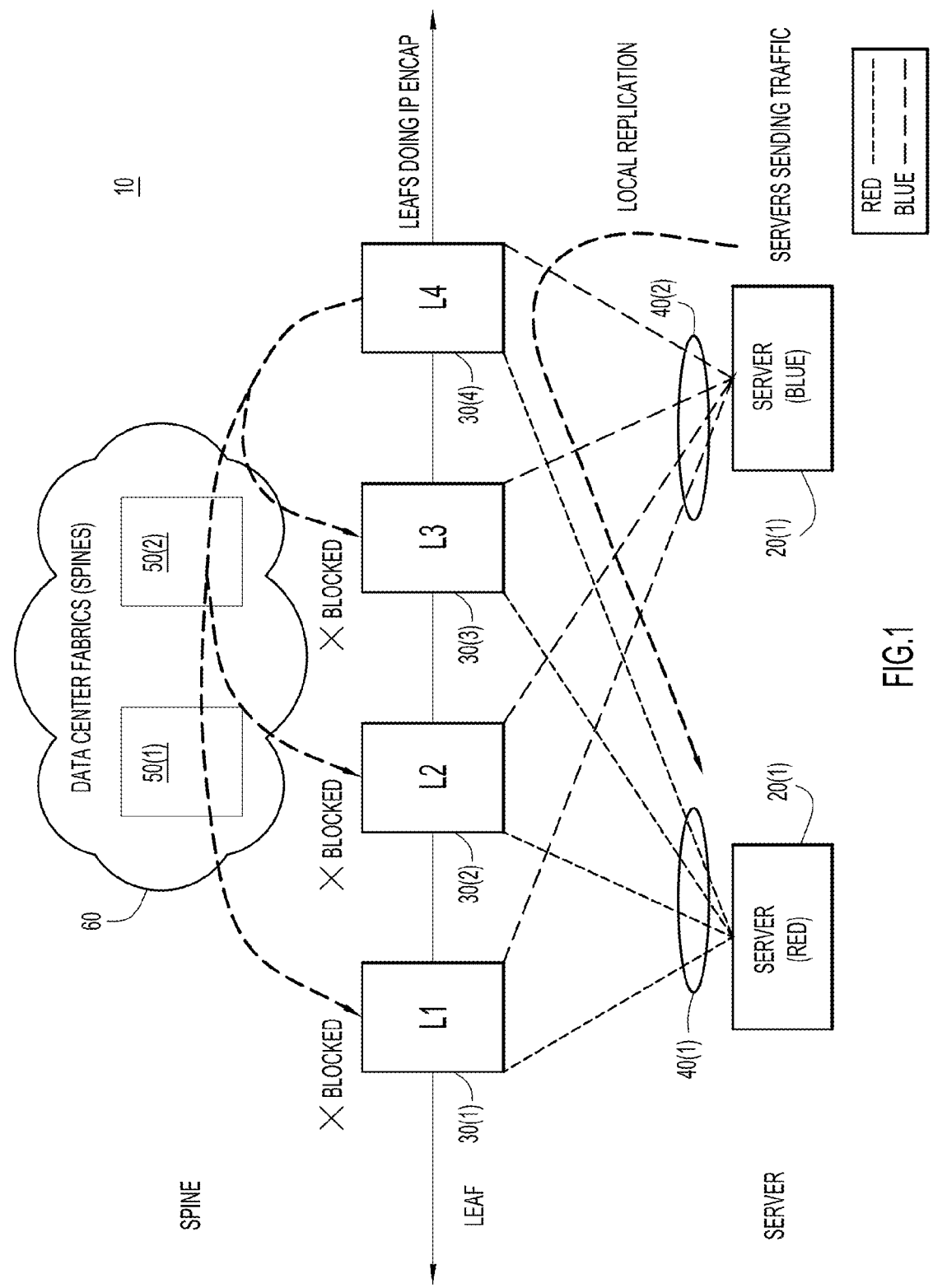
FIG. 1 is a diagram of a networking environment illustrating the blocking of same-site Ethernet Segment traffic by edge network devices, according to an example embodiment.

Reference is first made to FIG. 1. FIG. 1 illustrates a multi-homed network environment 10, where each customer edge device is attached to multiple provider edge devices using a bundled aggregation link. Each of thee link bundles can be classified as a separate Ethernet Segment.

The servers 20(1) and 20(2) are multi-homed to 4 leaf nodes 30(1)-30(4), denoted L1-L4, respectively, using the first and second link bundles 40(1) and 40(2). The leaf nodes can also do access bridging between directly connected Ethernet Segments. Link bundle 40(1) is designated to be associated with a first Ethernet Segment (denoted "Red") and link bundle 40(2) is associated with a second Ethernet Segment (denoted "Blue"). The leaf nodes L1-L4 connect to spine nodes 50(1) and 50(2) in a data center fabric 60. The spine nodes 50(1) and 50(2) perform Layer 3 routing.

FIG. 1 shows an example in which L4 sends multi-destination traffic locally between the first and second Ethernet Segments (Red and Blue). The traffic from leaf L4 (except for orphan hosts) that is sent to the spines 50(1) and 50(1) and received at the other leaf nodes (L1-L3) is blocked from being sent back into the link bundles to the servers 20(1) and 20(2) to prevent loops and duplicates, as shown by the X's in FIG. 1.

Figure 2:
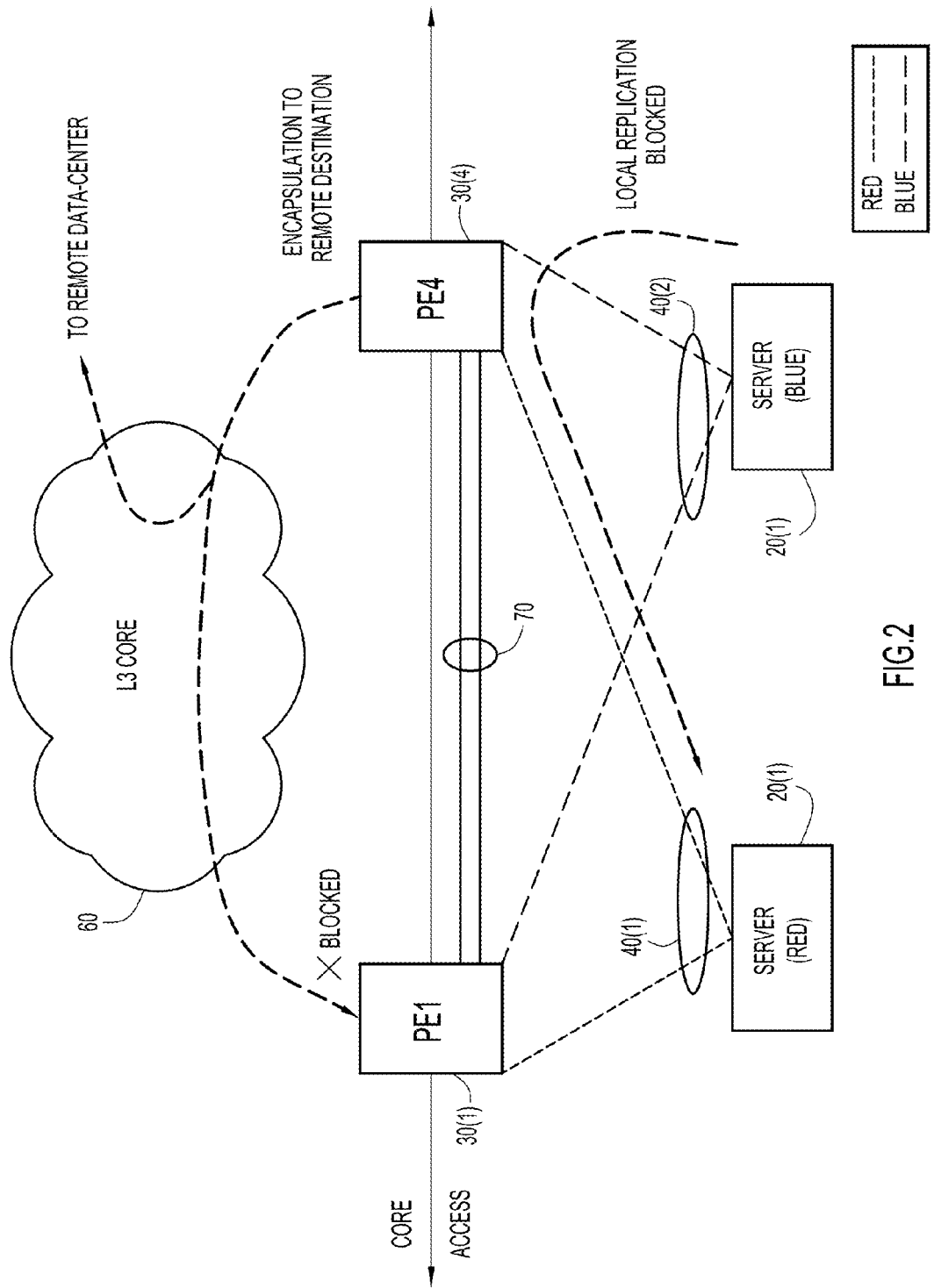
FIG. 2 is a diagram showing in more detail how edge network devices block same-site traffic to prevent loops, according to an example embodiment.

Reference is now made to FIG. 2. FIG. 2 depicts a similar topology as FIG. 1, where leaf nodes are referred to as provider edge (PE) nodes. Thus, FIG. 2 shows PE1 which corresponds to leaf 30(1) and PE4 corresponding to leaf 30(4), and PE1 and PE4 are connected to a Layer 3 (L3) core fabric, corresponding to the data center fabric 60 shown in FIG. 1. Also similar to what is shown in FIG. 1, there are two customer edge devices (servers 20(1) and 20(1) comprising two distinct Ethernet Segments (Red and Blue, respectively) each connected using a link aggregation technology, such as Virtual PortChannel (vPC) or other aggregation technology. The PE devices PE1 and PE4 are connected to each other via vPC links 70.

FIG. 2 also shows that PE4 sends multi-destination traffic locally between the Red and Blue Ethernet Segments. That is, Broadcast Unicast Multicast Traffic (BUM) traffic from the Blue Ethernet Segment (server 20(2)) is locally replicated by the receiving PE (PE4) to the Red Ethernet Segment (server 20(1)). Further, this traffic is also encapsulated to be sent to remote VPN sites.

As per the Ethernet Virtual Private Network (EVPN) procedures defined for Internet Protocol (IP) encapsulation in IETF draft-sd-l2vpn-evpn-overlay, draft-sajassi-l2vpn-evpn-segment-route-01, and draft-ietf-l2vpn-evpn-07, all encapsulated BUM traffic is received by all PE nodes including the ones belonging to the same site. However, local PE nodes drop the core BUM traffic that was originated from a same-site neighbor PE device to prevent duplicates and loops. Thus, for example, the traffic from PE4 from the core fabric 60 or the vPC peer link 70 is blocked by PE1 (except for orphan ports) to prevent loops and duplicates, similar to what is shown in FIG. 1. This is because there is an expectation that PE4 would do flooding of that traffic. This follows a core principle of link aggregation (e.g., vPC) that any broadcast traffic received via the peer link is not flooded back to the aggregated links. This applies across N peer devices connected via any link aggregation technology. This applies to traffic received from the core fabric 60 as well. Thus, any traffic received via the peer links or the core fabric by a PE device is not required to be flooded locally if it is originated from the same data center site.

Figure 3:
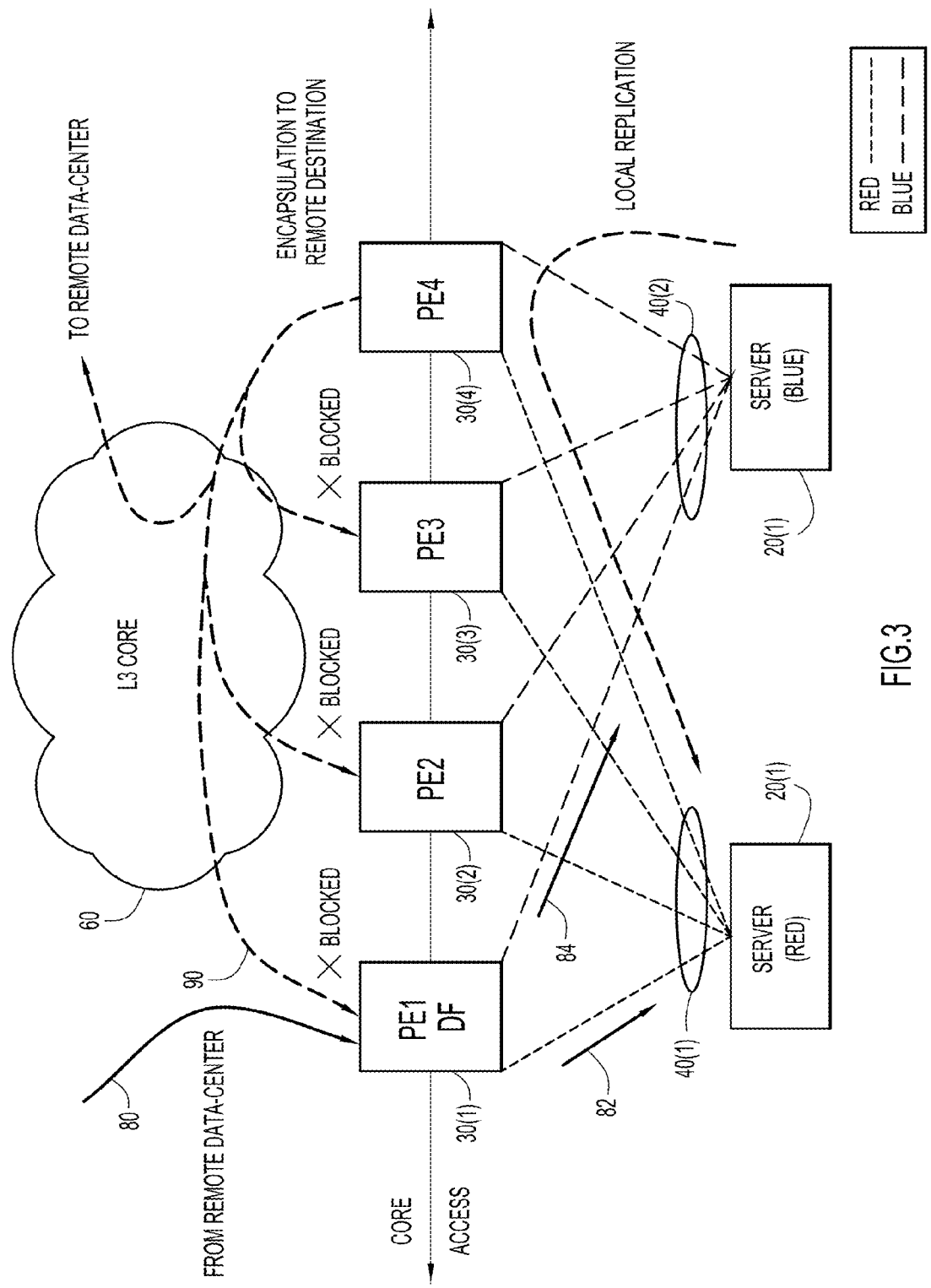
FIG. 3 is a diagram similar to FIG. 1, and illustrating how a Designated Forwarder edge network device decapsulates and floods traffic from a remote data center to Ethernet Segment links in a local data center, according to an example embodiment.

Turning now to FIG. 3, a diagram is shown that is similar to FIG. 2, but PE1 is, in this example, a Designated Forwarder (DF) as defined in EVPN. Current EVPN procedures define an elected DF per Ethernet Segment. The DF is responsible for decapsulating and forwarding traffic from "remote sites" on a given Ethernet Segment as per current EVPN procedures. For each Ethernet Segment, there is a DF elected using the EVPN Ethernet Segment Route. Northbound traffic to the core network 60 can be encapsulated by any receiving PE device based on the link aggregation hash. Southbound traffic from the core network can only be decapsulated and forwarded by the DF of a given Ethernet Segment. All the other PEs will drop southbound core traffic (except on orphan links).

FIG. 3 shows an example in which PE1 is the DF for both Red and Blue Ethernet Segments. PE1 decapsulates and floods traffic 80 from a remote data center to both Red and Blue Ethernet Segment links as shown at reference numerals 82 and 84, respectively. The topology is generalized to a 4-way multi-homing setup as the problem/solution is not specific to vPC (2-way arrangements).

However, the DF PE1 will drop all core fabric traffic shown at reference numeral 90 that originates from the same site PEs (PE2/PE3/PE4) as shown in FIG. 3. This identification can be made based on the source IP address of the packet or by inserting special tags in the packet that specify the Site ID. In case PE4 loses connectivity to the Red Segment due to failure of Red links on PE4, it will no longer be able to route Blue Segment traffic to the Red Segment. This will result in all the hosts and servers in the Red Segment experiencing extended traffic loss with respect to traffic from the Blue Segment.

Figure 4:
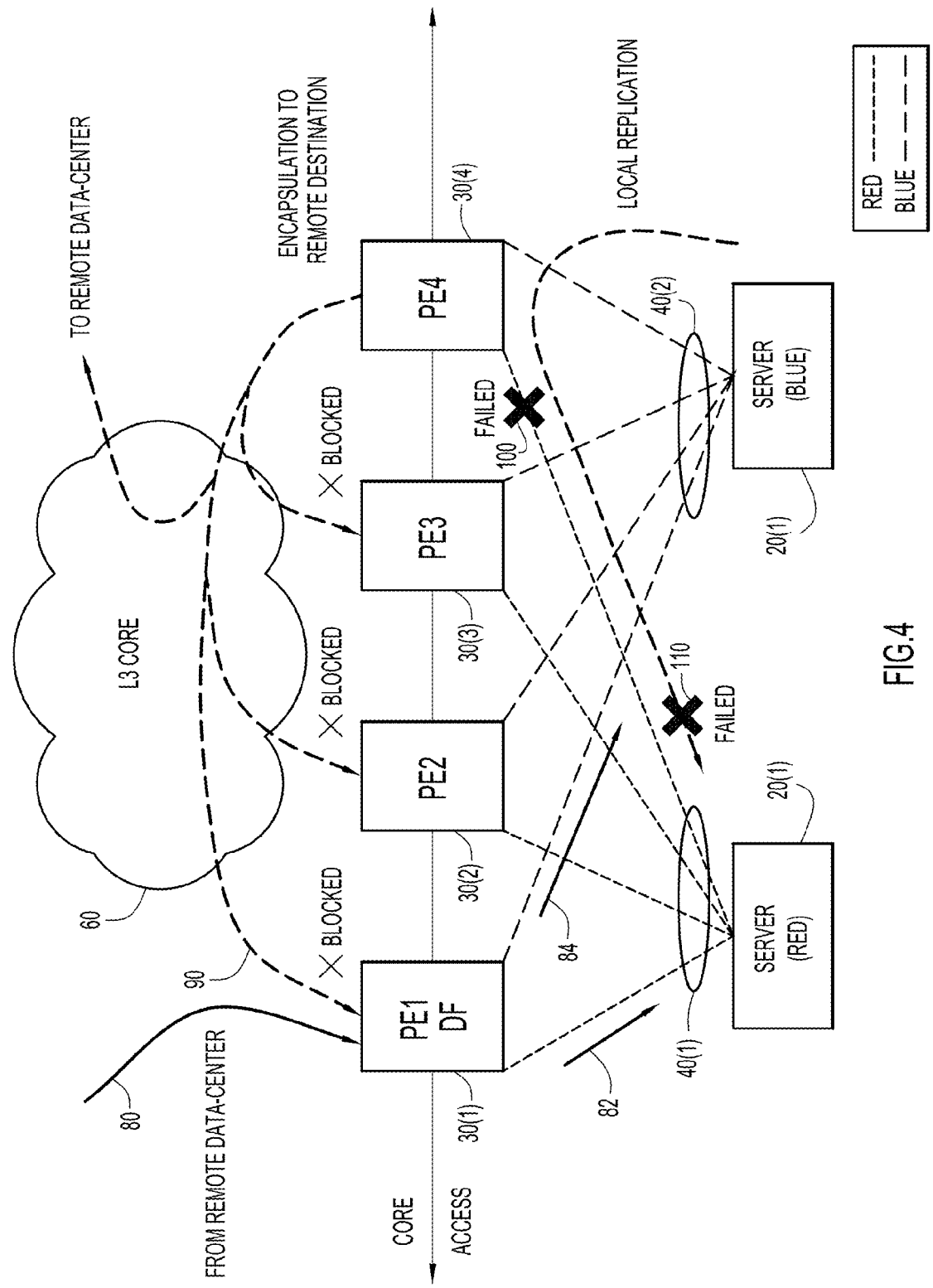
FIG. 4 is a diagram similar to FIG. 3, and illustrating how a link failure to a particular Ethernet Segment of an edge network device can result in loss of traffic to the particular Ethernet Segment.

FIG. 4 illustrates an example scenario when traffic for an Ethernet Segment has failed. EVPN procedures provide for a new DF election whenever an old DF fails. However, the elected DF only decapsulates remote site traffic coming from the core and blindly drops the same-site traffic coming from the core to prevent loops and duplicates. In the example of FIG. 4, the DF on the Red and Blue Segments (PE1) is not experiencing any failure. Furthermore, PE4 is encapsulating Blue traffic and sending it to the core fabric 60 to remote PE devices including PE1. However, this traffic is dropped by the DF (PE1) on the Blue Segment because it is from the same site.

When, as shown in FIG. 4, that the Red Ethernet Segment link of PE4 has failed at 100, PE4 cannot forward traffic to the Red Ethernet Segment. However, DF PE1 continues to block PE4's traffic it receives from the core fabric 60. This results in loss of traffic to the Red Ethernet Segment. This situation leads to prolonged loss of connectivity between locally attached Red and Blue Ethernet Segments as shown at reference numeral 110. That is, PE4 cannot connect traffic from the Red Ethernet Segment to the Blue Ethernet Segment, and cannot route traffic from the Blue Ethernet Segment to the Red Ethernet Segment.

Thus, short-comings exist in the EVPN procedures for IP encapsulation that need to be solved. First, the DF needs to be enabled to proxy forward same-site traffic on behalf of a PE on the same site if that PE gets disconnected from a local Ethernet Segment. Second, the proxy forwarding roles should be transitioned between PEs with a deterministic handshake that prevents duplication of traffic.

As per EVPN procedures defined for IP encapsulation, a DF election result applies to traffic incoming from remote sites. For traffic originating in the local site, the ingress PE directly forwards inter-segment traffic locally using local links.

A proxy local-forwarder is provided for local site traffic in case the directly attached PE is unable to bridge/route intersegment traffic. Presented herein is a set of operations in which a device can proxy forward "same-site" traffic. Thus, proxy forwarding, as used herein, is for "same-site" traffic, that is, traffic originated from the same data center site for which the PE devices are deployed, and not from a remote data center site. The DF of the Ethernet Segment itself can assume the proxy local-forwarder responsibility as it will definitely be active on the segment as per definition of a DF. The DF will need to takeover and give up the local-proxy role in lieu of one/many of the PE(s) on the segment depending on the state of the failed PE(s). Thus, a deterministic signaling mechanism is provided to transfer back and forth the proxy role in a reliable loop-free manner. Again, according to the embodiments presented herein, the device chosen to do proxy forwarding among multiple PEs is the DF.

Figure 5:
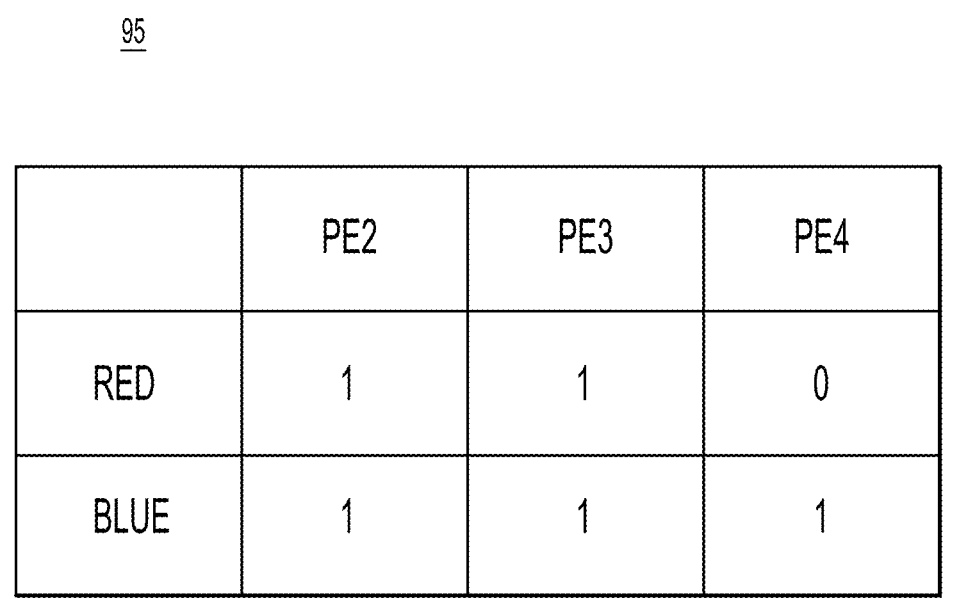

The DF PE1 maintains a list of devices that are attached to all its locally connected Ethernet Segments. This list is also used for DF election. FIG. 5 depicts such a list, shown at reference numeral 95, maintained on DF PE1. DF PE1 will build this table based on Border Gateway Protocol (BGP) EVPN Ethernet Segment Routes. This table is also be used by the DF PE1 to determine for which devices it needs to assume a proxy forwarding role in which Ethernet Segments. For example, for the example of FIG. 5, PE1 needs to assume proxy role for PE4 in the Red Segment. That is, a "0" indicates that a PE device is not attached on a particular Ethernet Segment, and that the DF PE1 should proxy forward for that peer PE device on the corresponding Ethernet Segment, which in this example, is the Red Segment.

Figure 6:
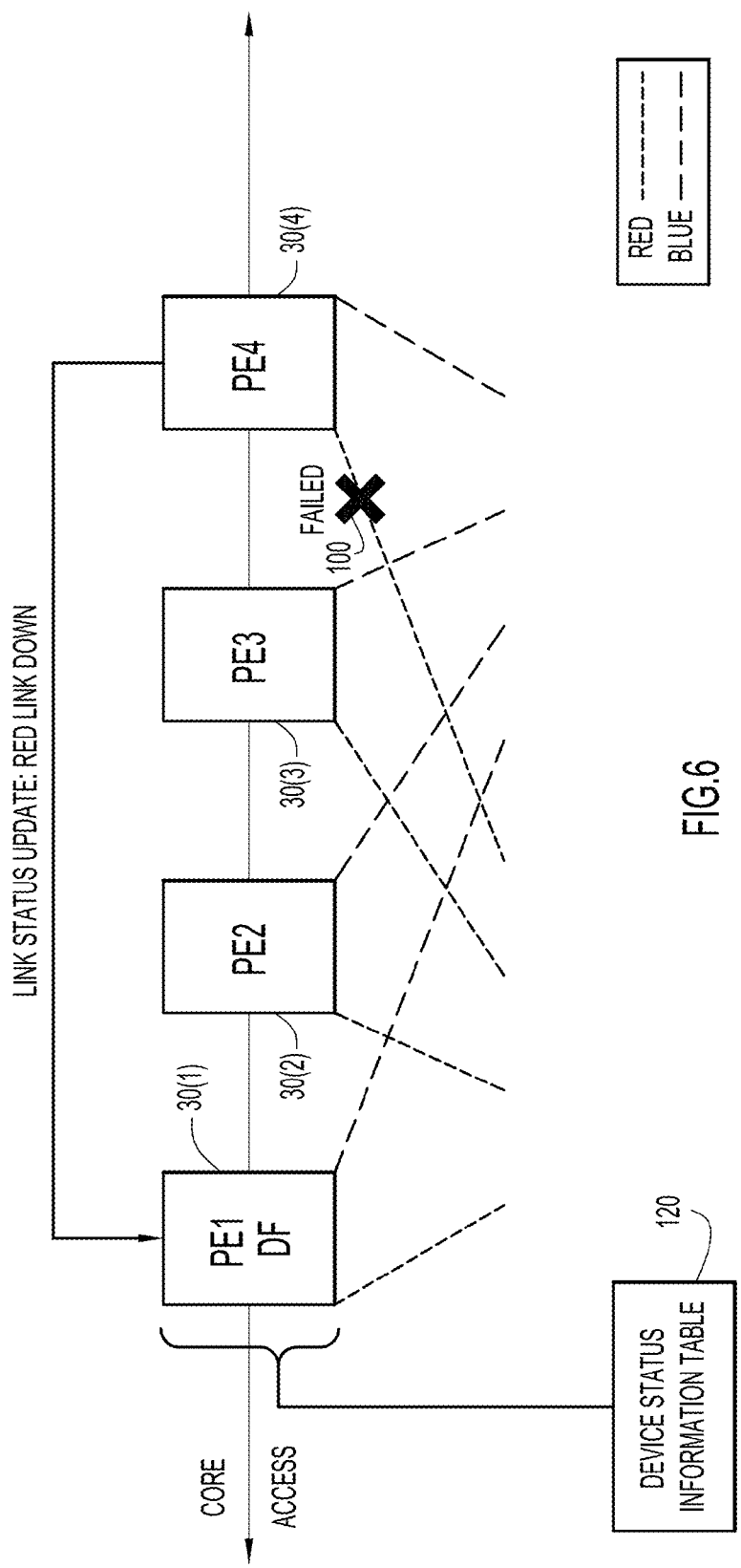
FIG. 6 is a block diagram showing a communication to the Designated Forwarder edge network device, the communication indicating a link failure for a particular Ethernet Segment at another edge network device, according to an example embodiment.

All PE devices send updates to each other when a link status changes (failed/down, repaired/up). The default state is that the link is up until it is notified by a PE that a link for that PE is down. Then the state changes and will stay in the failed/down state until notified later that it is back up. The link status update may be a notification sent in accordance with BGP or other suitable protocol. Thus, as depicted in FIG. 6, when PE1 receives a link status update from PE4 indicating that PE4's Red link is down, PE1 updates stored PE link state information table shown at reference numeral 120, in manner such as that shown in FIG. 5.

Figure 7:
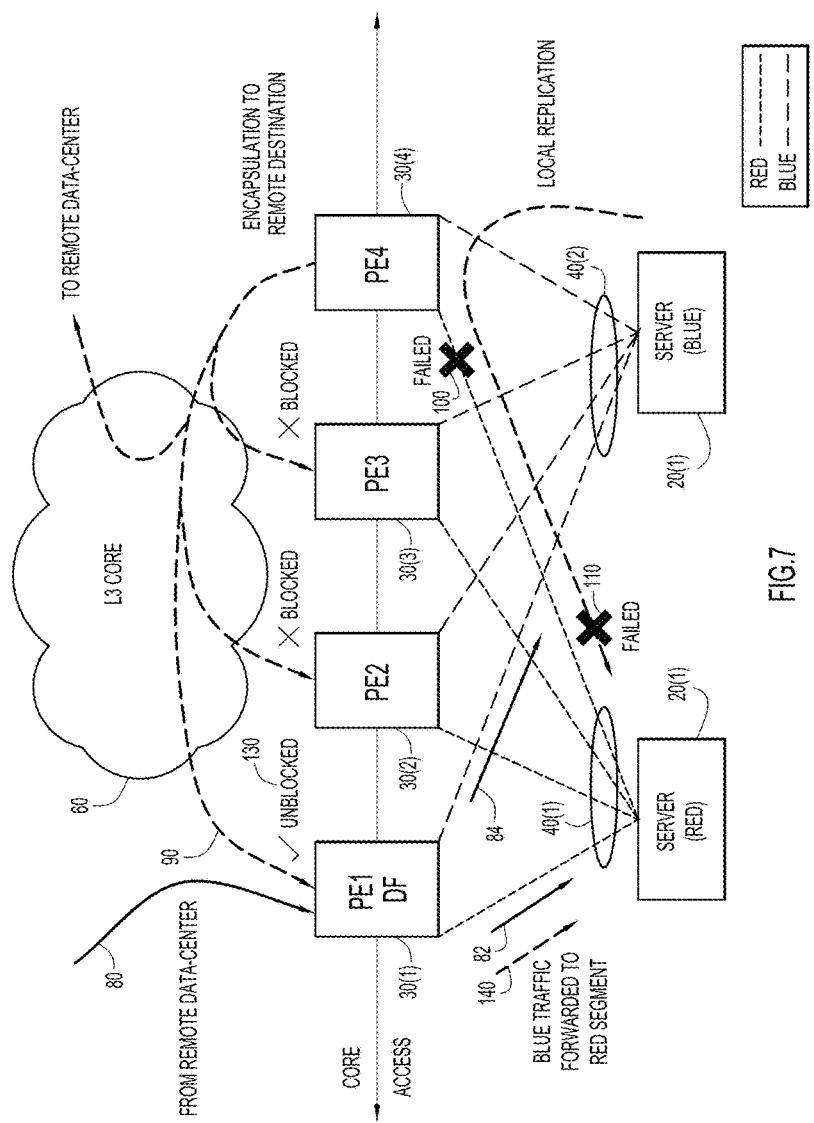
FIG. 7 is a diagram similar to FIG. 3, and showing the Designated Forwarder edge network device proxy forwarding traffic for the particular Ethernet Segment into the data center, according to an example embodiment.

After DF PE1 receives an update from PE4 that PE4 is not connected on the Red Segment, PE1 will assume a proxy forwarding role for traffic on that Ethernet Segment as depicted in FIG. 7. Specifically, in the example of FIG. 7, DF PE1 does not block PE4's traffic it receives from the core fabric 60, as indicated at reference numeral 130, and instead decapsulates and floods Blue Ethernet Segment traffic onto the Red Segment as shown at reference numeral 140. Instead of blocking that traffic (as it would normally), it unblocks the decapsulation (even for PE4's traffic). Thus, not only does PE1 forward traffic from the remote data center onto the Ethernet Segments, PE1 also forwards PE4's Blue Ethernet Segment traffic onto (and only onto) the Red Ethernet Segment links (not the Blue Ethernet Segment links) since PE4 can communicate on the Blue Ethernet Segment links.

Figure 8:
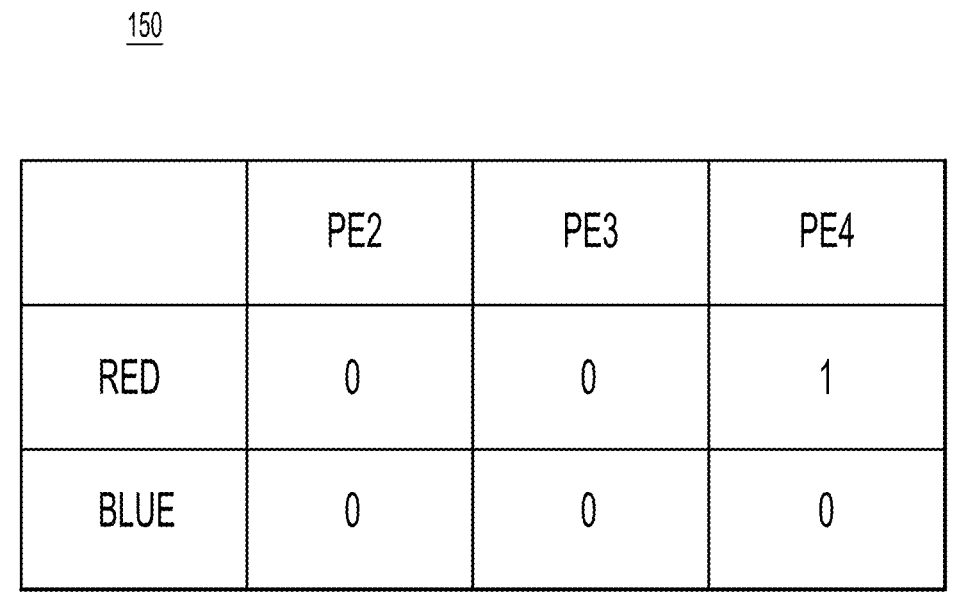
Figure 9:
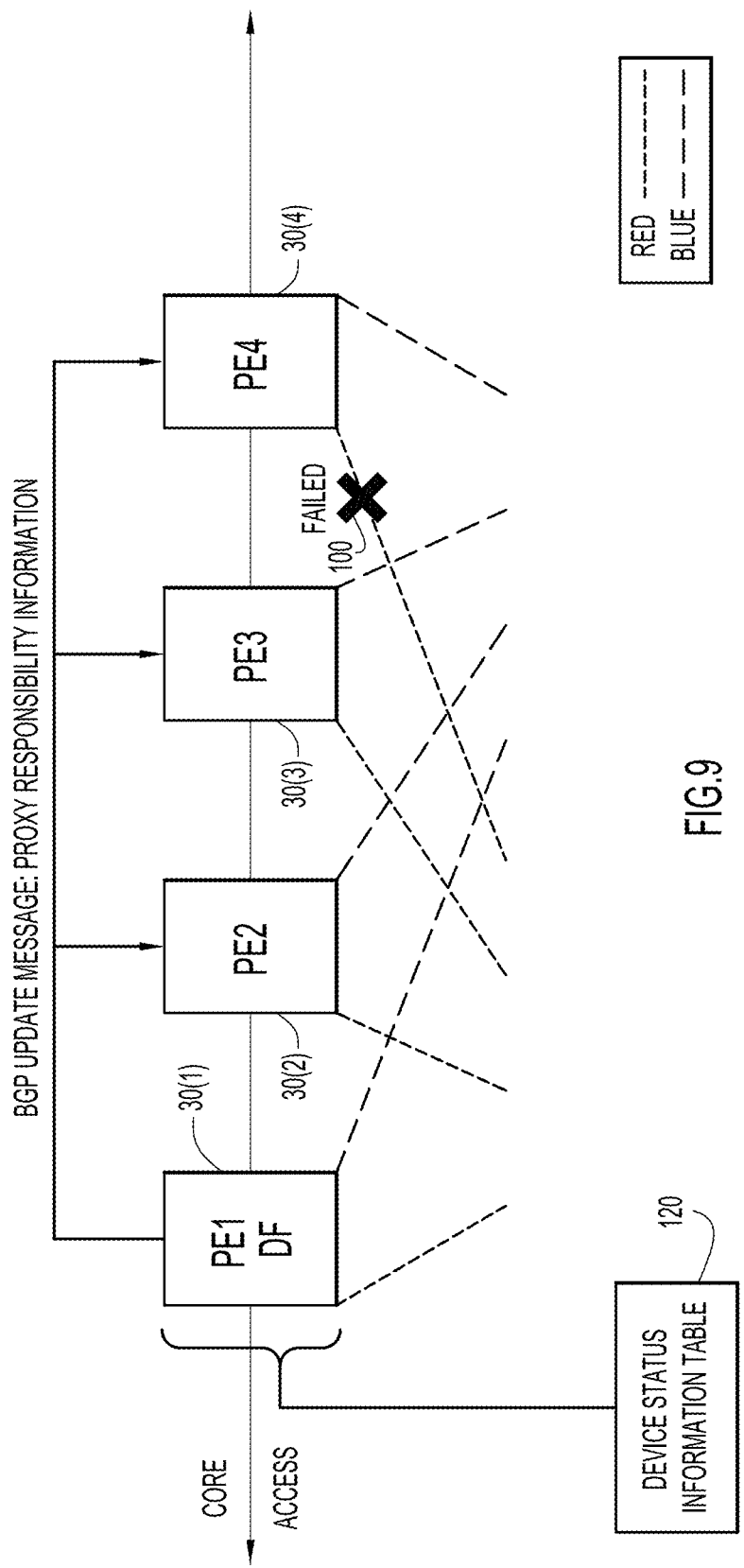
FIG. 9 illustrates a diagram similar to FIG. 6, and showing the Designated Forwarder edge network device advertising proxy responsibility information to its peer edge network devices, according to an example embodiment.

DF PE1 will also start advertising to its peer PE devices the fact that it has now assumed the proxy forwarding role for PE4 in the Red Segment. This may be done in the form of a BGP update message that includes a matrix/table of PE1's proxy roles, such as that shown at reference numeral 150 in FIG. 8. This table includes proxy responsibility information to indicate for which PE the DF PE1 has assumed the proxy forwarding role on a per Ethernet Segment basis. In the example of FIG. 8, a value of "1" indicates that PE1 is proxy forwarding for PE4 on the Red Segment. As shown in FIG. 9, the PE1 exports/advertises the proxy responsibility information to PE2, PE3 and PE4.

Figure 10:
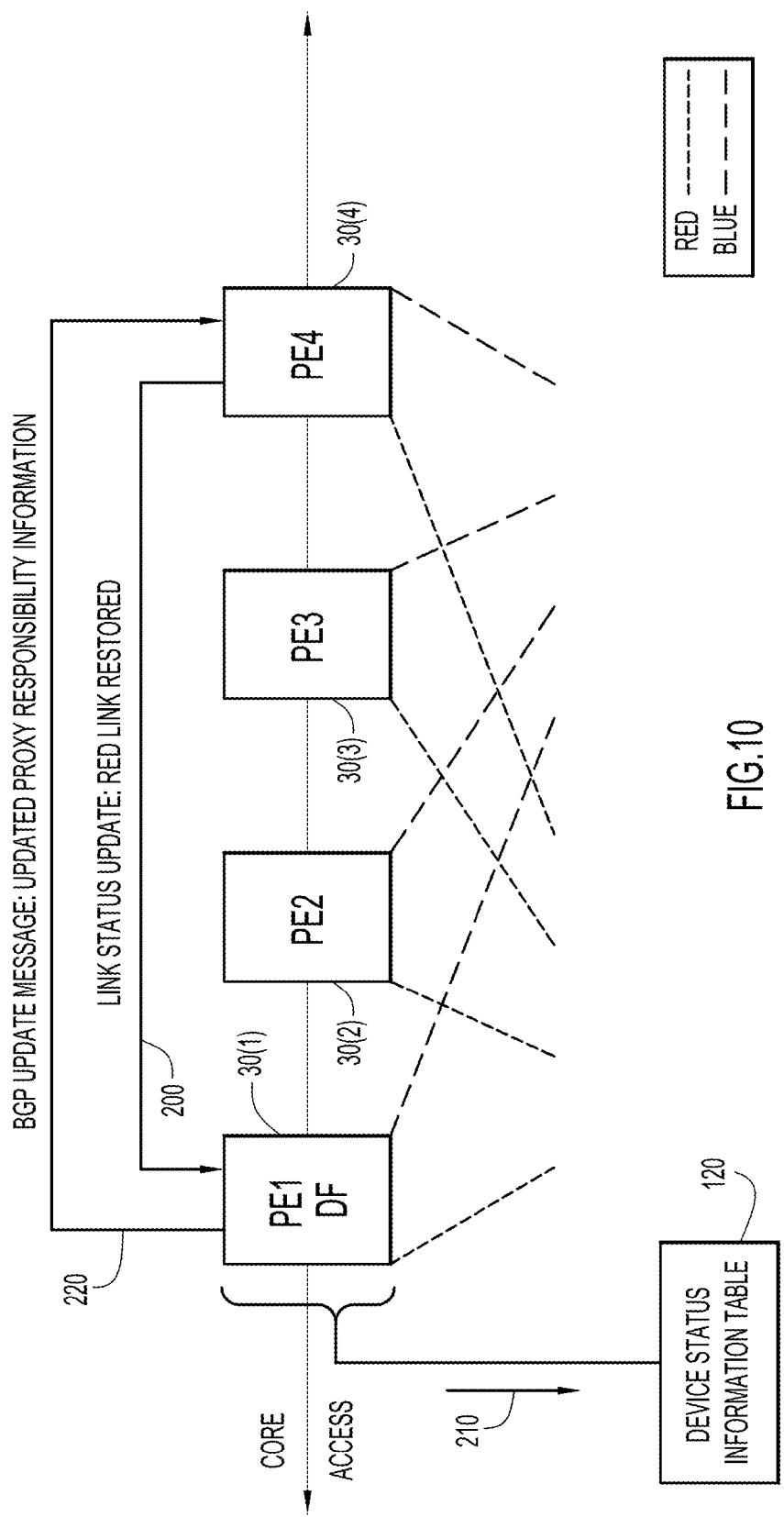
FIG. 10 illustrates a diagram similar to FIG. 9, and showing a handshake procedure between the Designated Forwarder edge network device and a peer edge network device to discontinue proxy forwarding, according to an example embodiment.

After some period of time, during which DF PE1 has been performing the proxy role for traffic from PE4, PE4 recovers its attachment circuit to the Red Segment. Upon this recovery, PE4 is capable of local routing between the Blue and Red Segments. However, currently PE1 is proxy forwarding on behalf of PE4. To ensure that both PE1 and PE4 do not forward Blue traffic to the Red Segment at the same time (which will cause duplicates and loops), a handshake is performed as now described in connection with FIG. 10.

At 200, PE4 notifies PE1, e.g. via Ethernet Segment BGP Network Layer Reachability Information (NLRI), with a link status update indicating that PE4 is now attached to Red Segment and is capable of forwarding in the Red Segment.

At 210, PE1 updates its internal table 120 regarding PE4's restored forwarding capability. PE1 gives up its proxy forwarding role and no longer forwards on the Red Segment on behalf of PE4.

As 220, PE1 generates and sends an update regarding its proxy forwarding responsibilities to indicate to PE4 that it is no longer proxy forwarding for PE4. PE4, upon receiving PE1's update at 220, resumes local routing of Blue Segment to Red Segment traffic.

This sequence is also repeated upon boot-up/insertion of PE4 to avoid any race conditions.

Figure 11:
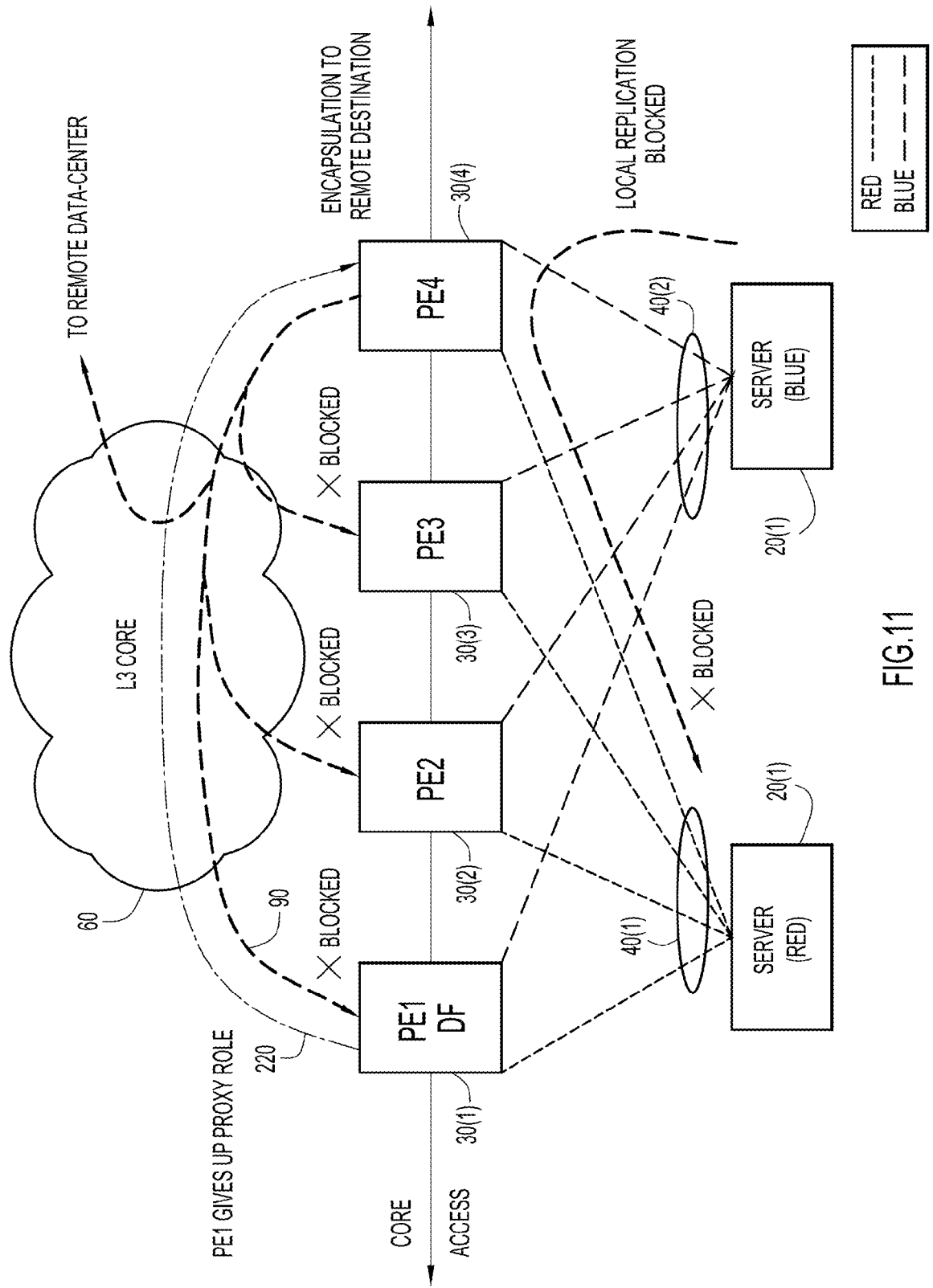
FIG. 11 illustrates a diagram similar to FIG. 3, and showing completion of the handshake procedure and the Designated Forwarder edge network device giving up its proxy forwarding role, according to an example embodiment.
Figure 12:
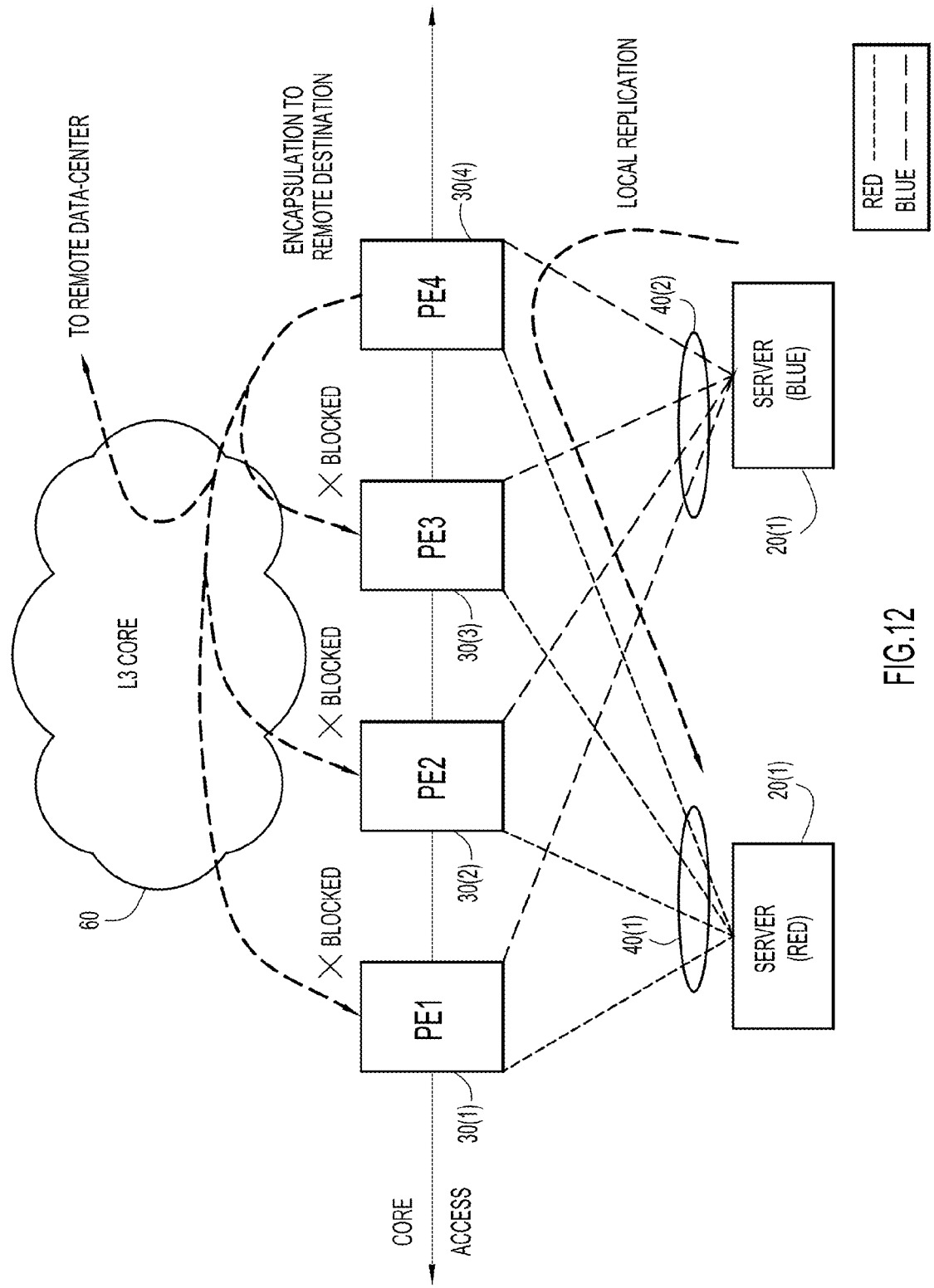
FIG. 12 illustrates a diagram similar to FIG. 11, and showing how the peer edge network device resumes its traffic forwarding responsibility after the Designated Forwarder edge network has relinquished its proxy forwarding role, according to an example embodiment.

FIG. 11 shows that PE4 waits to receive the update message at 220 from PE1 before PE4 resumes local forwarding responsibility. Then, as shown in FIG. 12, PE4 resumes local forwarding responsibility and PE1 blocks local forwarding of traffic it receives from PE4, as described above in connection with FIG. 3.

Figure 13:
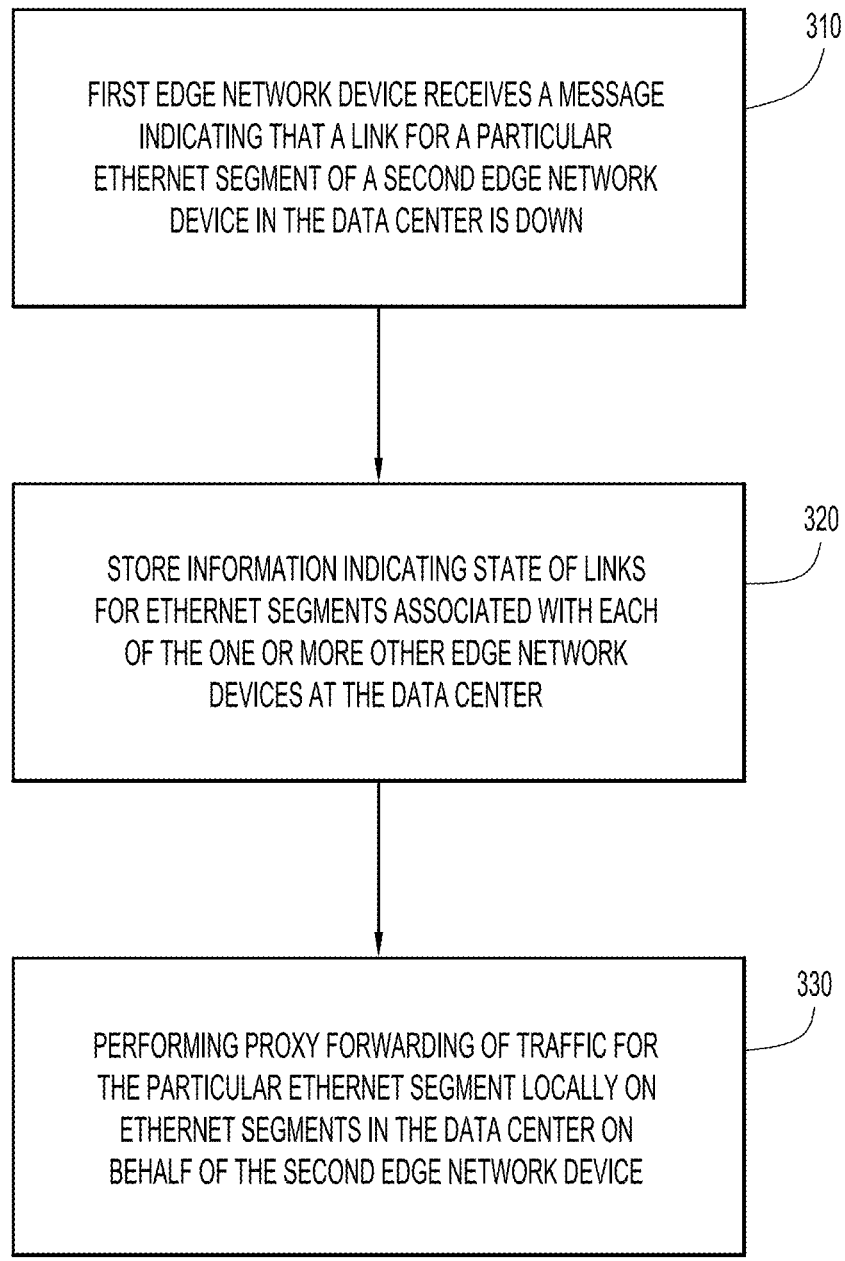
FIG. 13 is a flow chart depicting operations performed at a Designated Forwarder edge network device, according to an example embodiment.

Turning now to FIG. 13, a flow chart is shown for a process 300 performed by a provider edge network device in accordance with the embodiments described herein. The order of the operations depicted in FIG. 13 is not meant to be limited to the sequence shown in FIG. 13. The process 300 is described in connection with a multi-homed virtual private network for a data center in which there are a plurality of peer edge network devices including an arbitrary first edge network device and an arbitrary second edge network device. In this example description, the first edge network device is akin to the DF PE1 described above and the second edge network device is akin to PE4 described above. Moreover, the first edge network device and second edge network device (and any other peer edge network devices) are configured to perform multi-homed forwarding of virtual private network traffic for a plurality of Ethernet segments in the data center. Further still, the first edge device performs EVPN procedures in which the first edge device decapsulates and forwards traffic into the data center from a remote data center and drops traffic originating from the data center to avoid loops and duplicates.

At 310, the first edge network device receives from the second edge network device a message indicating that a link for a particular Ethernet segment of the second edge network device in the data center is down (has failed). At 320, the first edge network device stores information indicating state of links for Ethernet segments associated with each of the one or more other edge network devices at the data center. The information indicating state of links for Ethernet segments may be built based on BGP Ethernet Segment Routes. The proxy forwarding performed by the first edge network device involves forwarding of traffic for the particular Ethernet segment that originates from the data center. At 330, the first edge network device performs proxy forwarding of traffic for the particular Ethernet segment locally on Ethernet segments in the data center on behalf of the second edge network device.

As explained above in connection with FIGS. 10-12, the first edge network device sends to the second edge network device proxy forwarding responsibility information indicating to the second edge network device that the first edge network edge device is performing proxy forwarding of traffic for the particular Ethernet segment on behalf of the second edge network device. The proxy forwarding responsibility information may be sent in a BGP update message.

At some point in time after the first edge network device has been proxy forwarding for the second edge network device, the first edge network device may receive a notification that the link for the particular Ethernet segment of second edge network device has been restored. In this case, the first edge network device updates the information indicating state of links for Ethernet segments based on the notification received from the second edge network device. Furthermore, the first edge network device may terminate proxy forwarding of traffic for the particular Ethernet segment on behalf of the second edge network device, and send to the second edge network device updated proxy forwarding responsibility forwarding information that indicates that the first edge network device is no longer proxy forwarding traffic for the particular Ethernet segment on behalf of the second edge network device. Receipt of the updated proxy forwarding responsibility forwarding information causes the second edge network device to resume forwarding of traffic on the link for the particular Ethernet segment.

Figure 14:
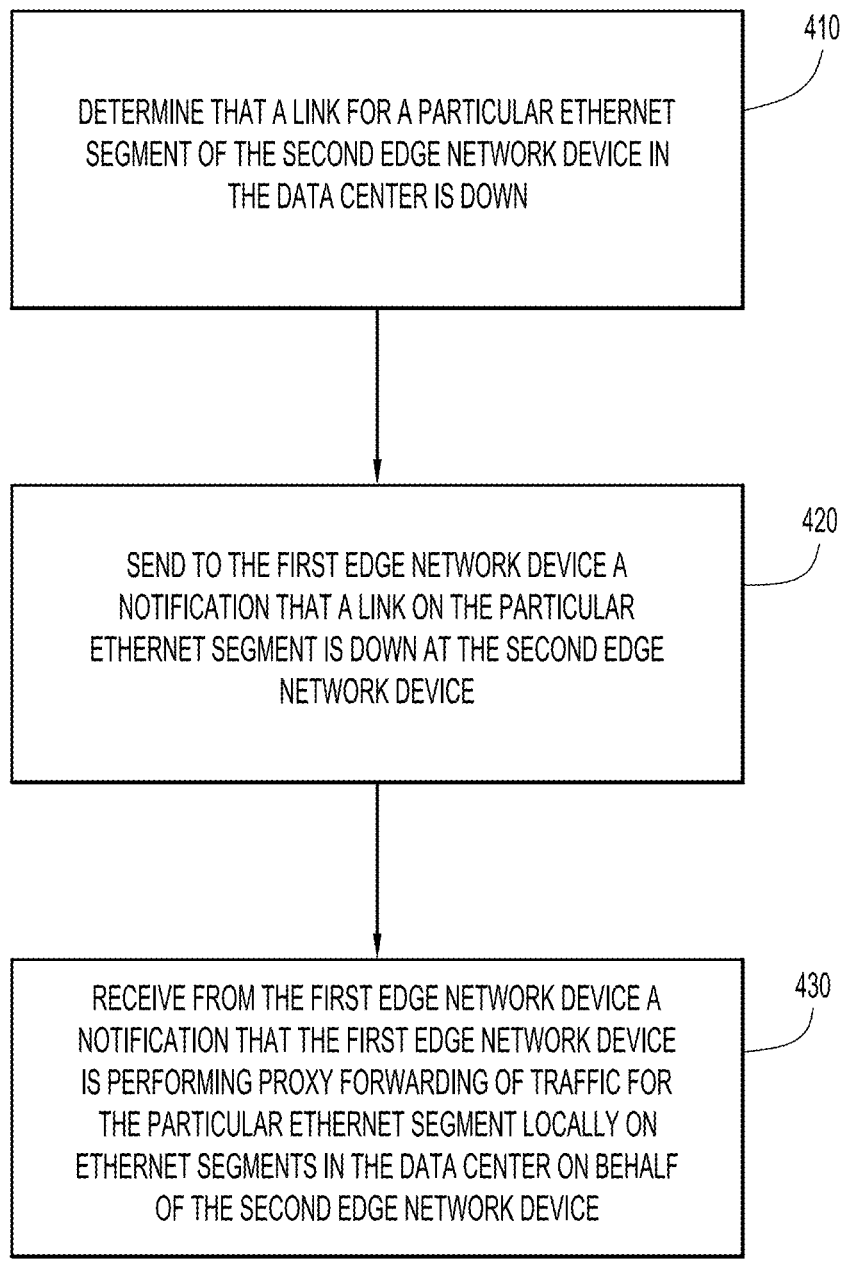
FIG. 14 is a flow chart depicting operations performed in a peer edge network device at which a link failure occurs for the particular Ethernet Segment, according to an example embodiment.

Turning now to FIG. 14, a flow chart is described for operations performed an edge network device where a failed link occurs. This flow chart pre-supposes a multi-homed virtual private network for a data center in which there are a plurality of peer edge network devices including an arbitrary first edge network device and an arbitrary second edge network device. The failure occurs for a link at the second edge network device. This flow chart presents the operations performed by the edge network device at which the link failure, and in particular the handshake operations that occur after the failed link is restored. At 410, the second edge network device determines that a link for a particular Ethernet segment of the second edge network device in the data center is down. At 420, the second edge network device sends to the first edge network device a notification that a link on the particular Ethernet segment is down at the second edge network device. At 430, the second edge network device receives from the first edge network device a notification that the first edge network device is performing proxy forwarding of traffic for the particular Ethernet segment locally on Ethernet segments in the data center on behalf of the second edge network device. The notification from the first edge network device may comprise a BGP update message that includes proxy forwarding responsibility information indicating for which edge network devices and Ethernet segments the first edge network device is performing proxy forwarding in the data center.

Furthermore, the second edge network device may subsequently determine that the link at the second edge network device for the particular Ethernet segment is restored. When that occurs, the second edge network device sends to the first edge network device a notification that the link on the particular Ethernet segment is restored. The second edge network device then may receive a notification from the first edge network device that the first edge network device has stopped proxy forwarding traffic for the particular Ethernet segment on behalf of the second edge network device. Upon receiving the notification that the first edge network device has stopped proxy forwarding, the second edge network device forwards traffic for the particular Ethernet segment on the link that has been restored.

Figure 15:
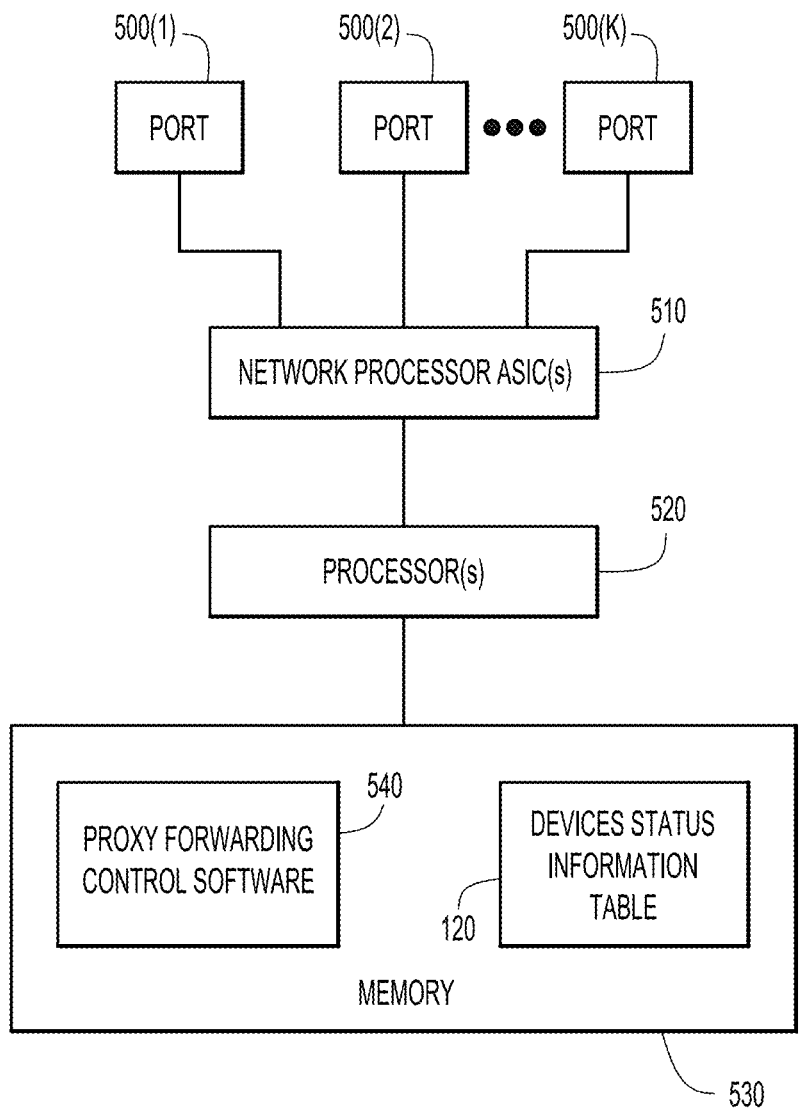
FIG. 15 is a block diagram of a network device configured to perform the operations presented herein, according to an example embodiment.

FIG. 15 illustrates a block diagram of a network device that is configured to perform the proxy forwarding techniques according to the embodiments presented herein. The network device illustrated in FIG. 15 is generically labeled by reference numeral $30(i)$ to indicate that it may be any of the PE network devices $30(1)$-$30(4)$ shown in the previous figures. The network device $30(i)$ includes a plurality of ports $500(1)$-$500(K)$ that can receive traffic from a network and send traffic into a network. One or more network processor application specific integrated circuits (ASIC) 510 are shown connected to the ports $500(1)$-$500(K)$. The network processor ASIC(s) 510 performs any of a variety of networking functions (routing, switch, network address translation, etc.). The network processor ASICs 510 is also referred to herein as a network processor unit that performs one or more networking functions for packets received at the ports and to be sent from the ports. A control processor 520 is provided for higher level control functions of the network device $30(i)$. The control processor 520 may be a microprocessor or microcontroller, or multiple instances of a microprocessor or microcontroller. The processor 520 is connected a memory 530. The memory 530 stores instructions for execution by the processor 520 as well as other data used in the course of the operations performed by the network device $30(i)$. To this end, the memory 530 stores proxy forwarding control software 540 and the device status information table 120 (described above in connection with FIGS. 6, 9 and 10).

The memory 530 may comprise read only memory (ROM), random access memory (RAM), magnetic disk storage media devices, optical storage media devices, flash memory devices, electrical, optical, or other physical/tangible memory storage devices. Thus, in general, the memory 530 may comprise one or more tangible (non-transitory) computer readable storage media (e.g., a memory device) encoded with software comprising computer executable instructions and when the software is executed (by processor 520) it is operable to perform the operations described herein in connection with FIGS. 1-14. In another embodiment, the operations described herein may be performed by the network processor ASIC(s) 510.

FIG. 15 is also representative of a device that is operable to perform the operations depicted in FIG. 14. In this regard, software is stored in the memory 530 that, when executed by processor 520, causes the processor 520 to perform the operations depicted in FIG. 14.

To summarize, in multi-homing VPN networks/data center fabrics, access traffic is encapsulated and sent across the core network by PE devices. Local bridging within the access network is done using access links local to the site. However, as per the EVPN procedures defined for IP encapsulation, core traffic originated from same-site PE devices is blindly dropped upon receipt to prevent loops and duplicates. Local traffic forwarding is done solely based on local links. When some of these local links fail and local bridging is affected, an alternative form of local bridging can be achieved by using the core encapsulated traffic. This can be done by making the DF PE device a proxy forwarder of same-site traffic on behalf of another PE device that is unable to do local bridging. The procedures presented herein ensure alternative bridging of access traffic in failure scenarios while ensuring deterministic hand-off of proxy forwarding roles between PE devices so that there are no loops and duplicates. In particular, these procedures delegate local bridging functions within the same site when one of the same-site routers/leafs using EVPN IP encapsulation techniques fail to bridge local traffic. This is extremely useful in data-center fabrics where financial customers require minimum traffic loss in failure scenarios. These procedures solve a general N node multi-homing proxy local-bridging delegation scenario and is not specific to only dual-homed technologies like vPC. These procedures delegate local bridging responsibility in a deterministic, handshake-based, loop-free fashion while avoiding duplication of traffic.

To summarize, in one form, a method is provided in which, in a multi-homed virtual private network for a data center in which there are a plurality of peer edge network devices including a first edge network device and a second edge network device, at the first edge network device: receiving from the second edge network device a message indicating that a link for a particular Ethernet segment of the second edge network device in the data center is down; storing information indicating state of links for Ethernet segments associated with each of the one or more other edge network devices at the data center; and performing proxy forwarding of traffic for the particular Ethernet segment locally on Ethernet segments in the data center on behalf of the second edge network device. The proxy forwarding is performed for traffic for the particular Ethernet segment that originates from the data center, that is, proxy forwarding is performed for "same-site" traffic.

In another form, a method is provided in which, in a multi-homed virtual private network for a data center in which there are a plurality of peer edge network devices including a first edge network device and a second edge network device, at the second edge network device: determining that a link for a particular Ethernet segment of the second edge network device in the data center is down; sending to the first edge network device a notification that a link on the particular Ethernet segment is down at the second edge network device; and receiving from the first edge network device a notification that the first edge network device is performing proxy forwarding of traffic for the particular Ethernet segment locally on Ethernet segments in the data center on behalf of the second edge network device.

In still another form, a non-transitory computer readable storage media is provided that is encoded with instructions that, when executed by a processor of a first edge network device operating in a multi-homed virtual private network for a data center in which there are a plurality of peer edge network devices including the first edge network device and a second edge network device, the instructions causing the processor to perform operations comprising: receiving from the second edge network device a message indicating that a link for a particular Ethernet segment of the second edge network device in the data center is down; storing information indicating state of links for Ethernet segments associated with each of the one or more other edge network devices at the data center; and performing proxy forwarding of traffic for the particular Ethernet segment locally on Ethernet segments in the data center on behalf of the second edge network device.

In yet another form, an apparatus is provided comprising: a plurality of ports that send packets to and receive packets from a network on behalf of a first edge network device operating in a multi-homed virtual private network for a data center in which there are a plurality of peer edge network devices including the first edge network device and a second edge network device; a memory; a network processor unit that performs one or more network functions for packets received at the ports and to be sent from the ports; and a processor coupled to the network processor unit and the memory, wherein the processor: receives from the second edge network device a message indicating that a link for a particular Ethernet segment of the second edge network device in the data center is down; stores in the memory information indicating state of links for Ethernet segments associated with each of the one or more other edge network devices at the data center; and performs proxy forwarding of traffic for the particular Ethernet segment locally on Ethernet segments in the data center on behalf of the second edge network device.

The above description is intended by way of example only. Various modifications and structural changes may be made therein without departing from the scope of the concepts described herein and within the scope and range of equivalents of the claims.

What is claimed is:

1. A method comprising:
   in a multi-homed virtual private network for a data center in which there are a plurality of peer edge network devices including a first edge network device and a second edge network device, at the first edge network device:
   receiving from the second edge network device a message indicating that a link for a particular Ethernet segment of the second edge network device in the data center is down;
   storing information indicating state of links for Ethernet segments associated with each of the one or more other edge network devices at the data center; and
   performing proxy forwarding of traffic for the particular Ethernet segment locally on Ethernet segments in the data center on behalf of the second edge network device.

2. The method of claim 1, further comprising sending from the first edge network device to the second edge network device proxy forwarding responsibility information indicating to the second edge network device that the first edge network edge device is performing proxy forwarding of traffic for the particular Ethernet segment on behalf of the second edge network device.

3. The method of claim 1, wherein the first edge device and the second edge device perform multi-homed forwarding of virtual private network traffic for a plurality of Ethernet segments in the data center.

4. The method of claim 1, wherein the first edge device performs Ethernet virtual private network procedures in which the first edge device decapsulates and forwards traffic into the data center from a remote data center and drops traffic originating from the data center, and wherein performing proxy forwarding comprises forwarding of traffic for the particular Ethernet segment that originates from the data center.

5. The method of claim 1, wherein the information indicating state of links for Ethernet segments is generated based on Border Gateway Protocol Ethernet Segment Routes.

6. The method of claim 1, wherein sending comprises a Border Gateway Protocol update message that includes the proxy forwarding responsibility information.

7. The method of claim 1, further comprising receiving at the first edge network device a notification that the link for the particular Ethernet segment of second edge network device has been restored.

8. The method of claim 7, further comprising the first edge network device updating the information indicating state of links for Ethernet segments based on the notification received from the second edge network device.

9. The method of claim 8, further comprising the first edge network device:
   terminating proxy forwarding of traffic for the particular Ethernet segment on behalf of the second edge network device; and
   sending to the second edge network device updated proxy forwarding responsibility forwarding information that indicates that the first edge network device is no longer proxy forwarding traffic for the particular Ethernet segment on behalf of the second edge network device.

10. The method of claim 9, wherein the updated proxy forwarding responsibility forwarding information causes the second edge network device to resume forwarding of traffic on the link for the particular Ethernet segment.

11. A method comprising:
    in a multi-homed virtual private network for a data center in which there are a plurality of peer edge network devices including a first edge network device and a second edge network device, at the second edge network device:

determining that a link for a particular Ethernet segment of the second edge network device in the data center is down;
sending to the first edge network device a notification that a link on the particular Ethernet segment is down at the second edge network device; and
receiving from the first edge network device a notification that the first edge network device is performing proxy forwarding of traffic for the particular Ethernet segment locally on Ethernet segments in the data center on behalf of the second edge network device.

12. The method of claim 11, wherein the notification from the first edge network device comprises a Border Gateway Protocol update message that includes proxy forwarding responsibility information indicating for which edge network devices and Ethernet segments the first edge network device is performing proxy forwarding in the data center.

13. The method of claim 11, further comprising:
determining that the link at the second edge network device for the particular Ethernet segment is restored;
sending to the first edge network device a notification that the link on the particular Ethernet segment is restored;
receiving a notification from the first edge network device that the first edge network device has stopped proxy forwarding traffic for the particular Ethernet segment on behalf of the second edge network device; and
upon receiving the notification that the first edge network device has stopped proxy forwarding, forwarding traffic for the particular Ethernet segment on the link that has been restored.

14. The method of claim 13, wherein the notification that the first edge network device has stopped proxy forwarding received from the first edge network device comprises a Border Gateway Protocol update message that includes updated proxy forwarding responsibility information indicating that the first edge network device is no longer proxy forwarding for the second edge network device on the particular Ethernet segment.

15. The method of claim 13, wherein the first edge device and the second edge device perform multi-homed forwarding of virtual private network traffic for a plurality of Ethernet segments in the data center.

16. The method of claim 13, wherein the first edge device performs Ethernet virtual private network procedures in which the first edge device decapsulates and forwards traffic into the data center from a remote data center and drops traffic originating from the data center, and wherein performing proxy forwarding comprises forwarding of traffic for the particular Ethernet segment that originates from the data center.

17. A non-transitory computer readable storage media encoded with instructions that, when executed by a processor of a first edge network device operating in a multi-homed virtual private network for a data center in which there are a plurality of peer edge network devices including the first edge network device and a second edge network device, the instructions causing the processor to perform operations comprising:
receiving from the second edge network device a message indicating that a link for a particular Ethernet segment of the second edge network device in the data center is down;
storing information indicating state of links for Ethernet segments associated with each of the one or more other edge network devices at the data center; and
performing proxy forwarding of traffic for the particular Ethernet segment locally on Ethernet segments in the data center on behalf of the second edge network device.

18. The non-transitory computer readable storage media of claim 17, further comprising instructions causing the processor to send from the first edge network device to the second edge network device proxy forwarding responsibility information indicating to the second edge network device that the first edge network edge device is performing proxy forwarding of traffic for the particular Ethernet segment on behalf of the second edge network device.

19. The non-transitory computer readable storage media of claim 17, wherein the first edge device performs Ethernet virtual private network procedures in which the first edge device decapsulates and forwards traffic into the data center from a remote data center and drops traffic originating from the data center, and wherein the instructions for performing proxy forwarding comprise instructions for forwarding of traffic for the particular Ethernet segment that originates from the data center.

20. The non-transitory computer readable storage media of claim 17, further comprising instructions causing the processor to receive at the first edge network device a notification that the link for the particular Ethernet segment of second edge network device has been restored.

21. The non-transitory computer readable storage media of claim 17, further comprising instructions causing the processor to:
update the information indicating state of links for Ethernet segments based on the notification received from the second edge network device;
terminate proxy forwarding of traffic for the particular Ethernet segment on behalf of the second edge network device; and
send to the second edge network device updated proxy forwarding responsibility forwarding information that indicates that the first edge network device is no longer proxy forwarding traffic for the particular Ethernet segment on behalf of the second edge network device, wherein the updated proxy forwarding responsibility forwarding information causes the second edge network device to resume forwarding of traffic on the link for the particular Ethernet segment.

22. An apparatus comprising:
a plurality of ports that send packets to and receive packets from a network on behalf of a first edge network device operating in a multi-homed virtual private network for a data center in which there are a plurality of peer edge network devices including the first edge network device and a second edge network device;
a memory;
a network processor unit that performs one or more network functions for packets received at the ports and to be sent from the ports; and
a processor coupled to the network processor unit and the memory, wherein the processor:
receives from the second edge network device a message indicating that a link for a particular Ethernet segment of the second edge network device in the data center is down;
stores in the memory information indicating state of links for Ethernet segments associated with each of the one or more other edge network devices at the data center; and performs proxy forwarding of traffic for the particular Ethernet segment locally on Ethernet segments in the data center on behalf of the second edge network device.

23. The apparatus of claim 22, wherein the processor further sends from the first edge network device to the second edge network device proxy forwarding responsibility information indicating to the second edge network device that the first edge network edge device is performing proxy forwarding of traffic for the particular Ethernet segment on behalf of the second edge network device.

24. The apparatus of claim 22, wherein the first edge device and the second edge device perform multi-homed forwarding of virtual private network traffic for a plurality of Ethernet segments in the data center.

25. The apparatus of claim 22, wherein the first edge device performs Ethernet virtual private network procedures in which the first edge device decapsulates and forwards traffic into the data center from a remote data center and drops traffic originating from the data center, and wherein the processor is configured to perform proxy forwarding by forwarding of traffic for the particular Ethernet segment that originates from the data center.

26. The apparatus of claim 22, wherein the information indicating state of links for Ethernet segments is generated based on Border Gateway Protocol Ethernet Segment Routes.

27. The apparatus of claim 22, wherein the processor receives at the first edge network device a notification that the link for the particular Ethernet segment of second edge network device has been restored.

28. The apparatus of claim 22, wherein the processor updates the information indicating state of links for Ethernet segments based on the notification received from the second edge network device.

29. The apparatus of claim 28, wherein the processor further:

terminates proxy forwarding of traffic for the particular Ethernet segment on behalf of the second edge network device; and sends to the second edge network device updated proxy forwarding responsibility forwarding information that indicates that the first edge network device is no longer proxy forwarding traffic for the particular Ethernet segment on behalf of the second edge network device, wherein the updated proxy forwarding responsibility forwarding information causes the second edge network device to resume forwarding of traffic on the link for the particular Ethernet segment.

* * * * *